Jan. 17, 1933.　　　F. SLAVEK　　　1,894,894
AUTOMATIC POWER TRANSMISSION
Filed March 23, 1932　　　4 Sheets-Sheet 1

Inventor
FREDERICK SLAVEK.
By Clarence A. O'Brien
Attorney

Jan. 17, 1933.　　　F. SLAVEK　　　1,894,894
AUTOMATIC POWER TRANSMISSION
Filed March 23, 1932　　4 Sheets-Sheet 2

Inventor
FREDERICK SLAVEK.
By Clarence A. O'Brien
Attorney

Jan. 17, 1933. F. SLAVEK 1,894,894
AUTOMATIC POWER TRANSMISSION
Filed March 23, 1932 4 Sheets-Sheet 3
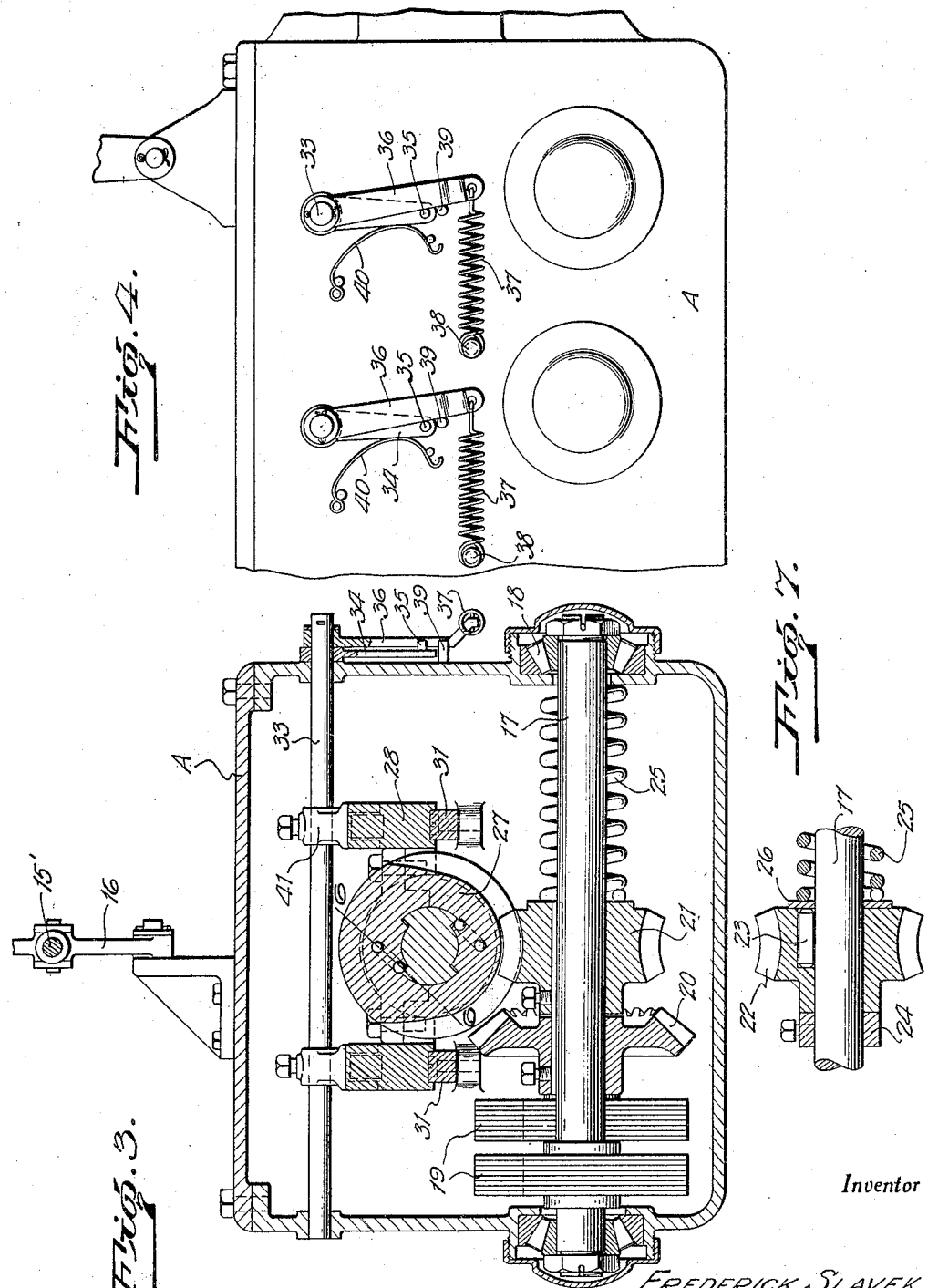
Inventor
FREDERICK SLAVEK
By Clarence A O'Brien
Attorney Jan. 17, 1933.　　　　F. SLAVEK　　　　1,894,894
AUTOMATIC POWER TRANSMISSION
Filed March 23, 1932　　4 Sheets-Sheet 4
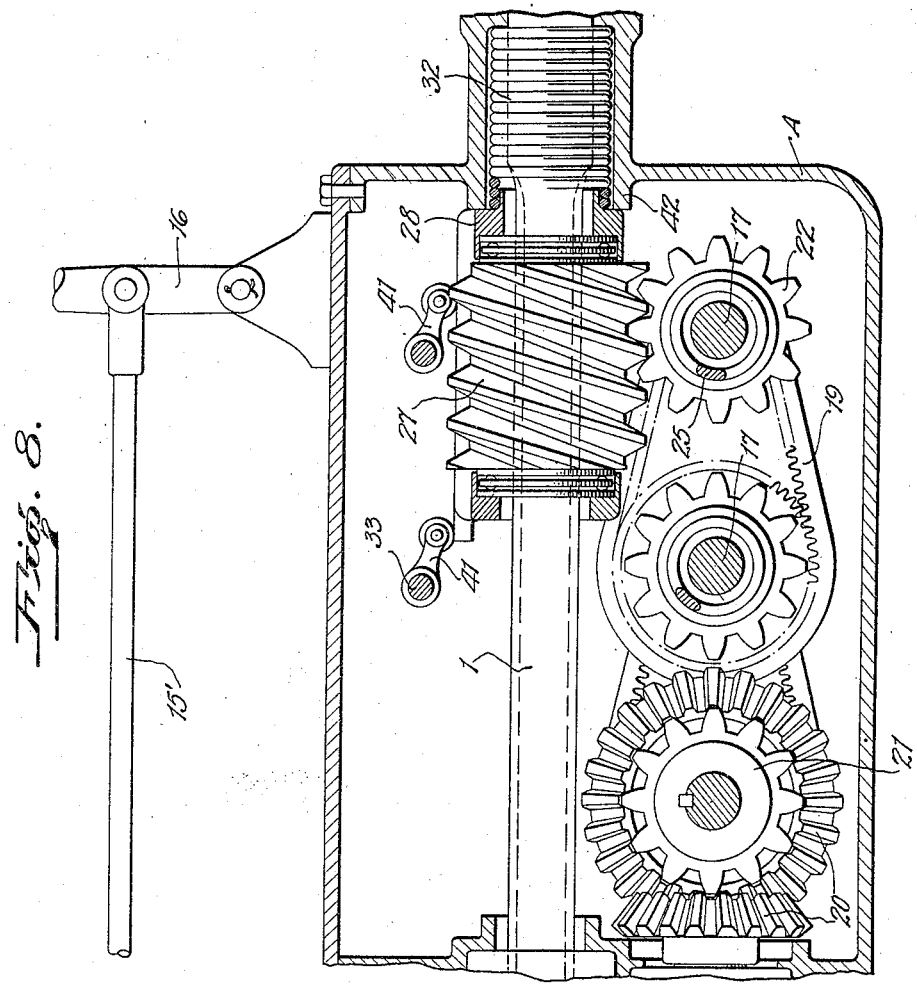
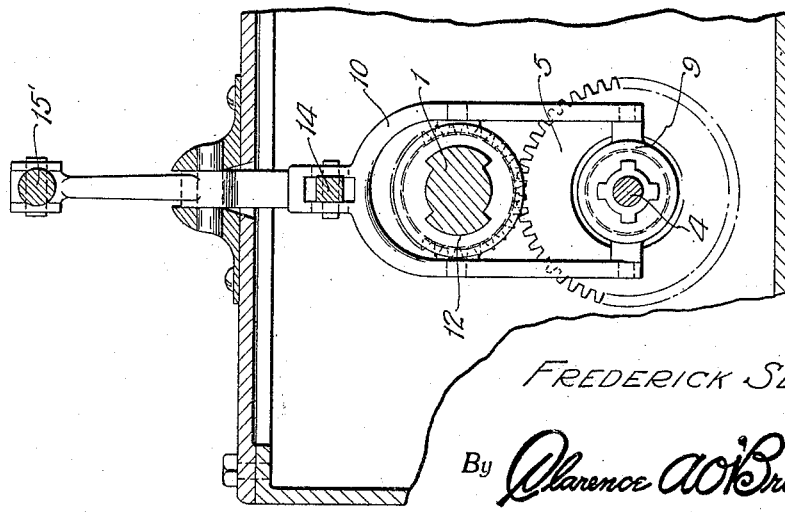
Inventor
FREDERICK SLAVEK.
By Clarence A. O'Brien
Attorney Patented Jan. 17, 1933

1,894,894

UNITED STATES PATENT OFFICE

FREDERICK SLAVEK, OF NEW YORK, N. Y.

AUTOMATIC POWER TRANSMISSION

Application filed March 23, 1932. Serial No. 600,782.

This invention relates to automatic power transmission means, the general object of the invention being to provide automatic means for changing gear ratios in accordance with the resistance offered by the driven shaft.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Fig. 3 is a section on line 3—3 of Fig. 1.

Fig. 4 is a fragmentary side view showing the spring means for holding the roller carrying arms in lowered position.

Fig. 5 is a section on approximately the line 5—5 of Fig. 1.

Fig. 6 is a section on approximately the line 6—6 of Fig. 3.

Fig. 7 is a sectional view in detail with parts in elevation through one of the spring-pressed worm gears of the part of the shaft shown in elevation.

Fig. 8 is a fragmentary vertical sectional view with the internal parts in elevation and showing the sliding worm in engagement with the low speed worm gear.

Figure 1:
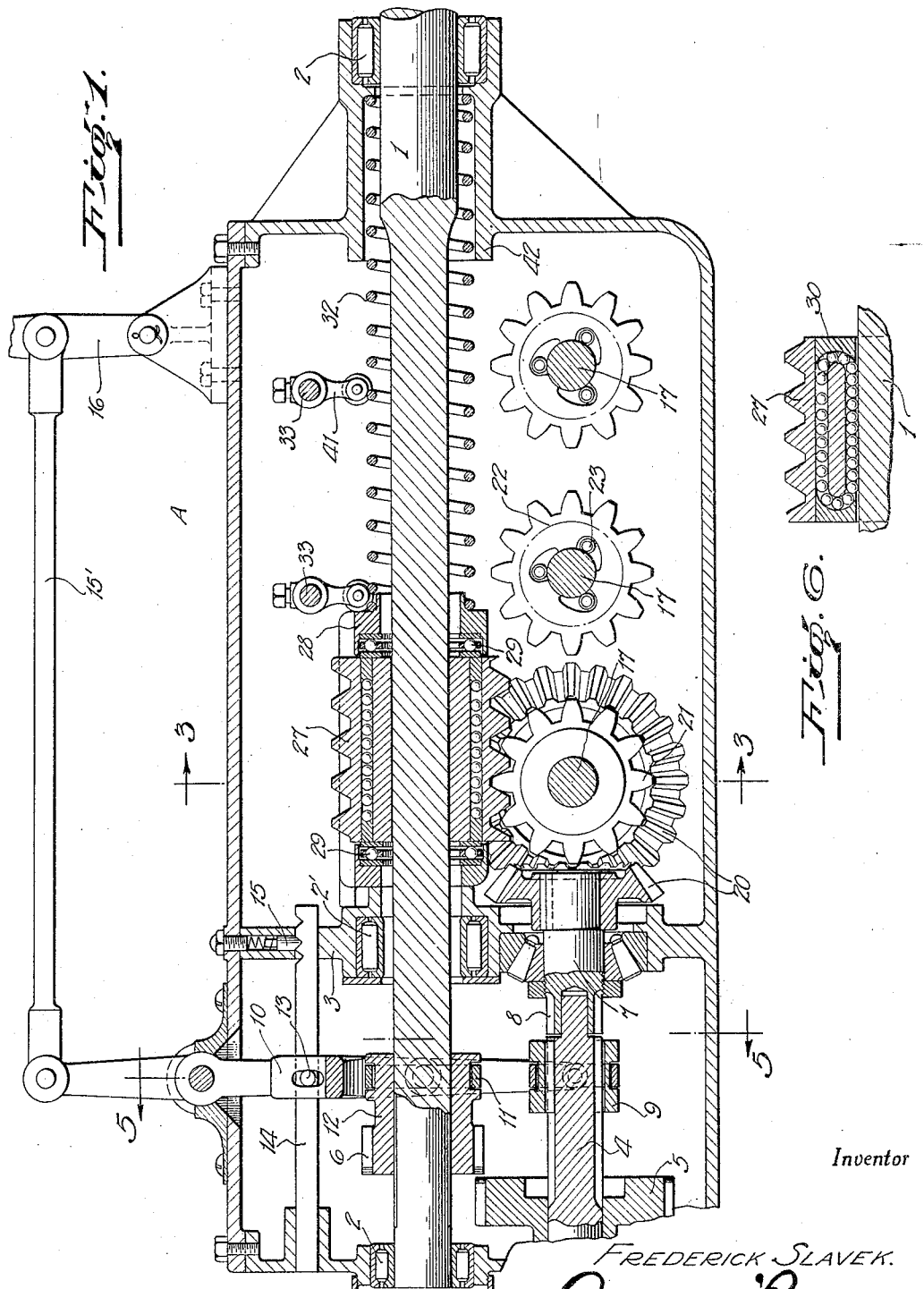
Figure 1 is a vertical sectional view through the invention.
Figure 2:
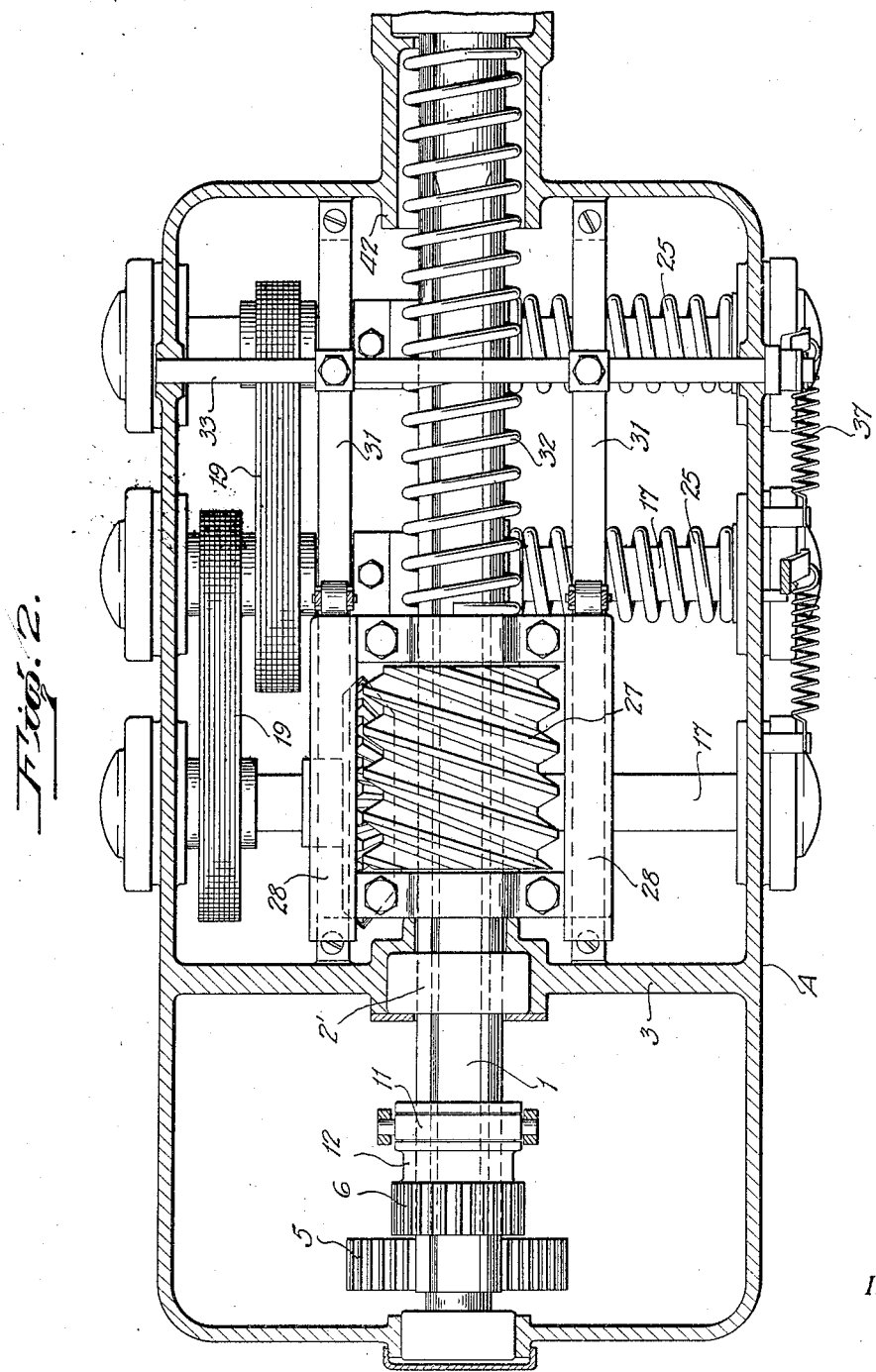
Fig. 2 is a horizontal sectional view through the internal part shown in plan.

In these drawings, the letter A indicates a housing into which extends the splined part of a shaft 1, said shaft being provided with the anti-friction means 2 at the ends of the housing and with the anti-friction means 2' in a partition 3 located in the housing. The shaft 4 extends into the opposite end of the housing and carries the reverse gear 5 adapted to mesh with the reverse gear 6 splined to the shaft 1. A stub shaft 7 is journalled in the partition and has a socket in its rear end for receiving a reduced end of the shaft 4, and this end of the stub shaft is formed with the teeth 8 for engagement by a clutch part 9 splined to the shaft 4.

A clutch fork 10 engages the clutch part 9 and a clutch ring 11 located in a groove formed in the extended part of the hub 12 of the gear 6. This fork is pivoted in the top part of the housing and is connected by the pin and slot connection 13 with a barrel 14 slidably arranged in the housing and held in any one of its free positions by a spring detent 15 carried by the partition.

The upper and outer end of the fork is connected by a link 15' to a shift lever 16 pivoted to the housing. Thus in one position of the fork, the gears 5 and 6 will be in mesh and the clutch part 9 will be out of engagement with the teeth 8 so that the stub shaft will not be rotated and the shafts 1 and 4 will be geared together. In another position, the gears 5 and 6 will be out of mesh and the clutch part 9 out of engagement with the teeth 8 so that the parts are in neutral position as shown in Fig. 1.

In the third position, the gears 5 and 6 will still be out of mesh but the clutch part 9 will connect the shaft 4 to the stub shaft 7, so that the rotary movement of the stub shaft 7 will be communicated to the shaft 4. It will of course be understood that when the gears 5 and 6 are in mesh, the mechanism connected with the shaft 4 will be driven in reverse.

A plurality of transverse shafts 17 are rotatably supported in the lower part of the housing between their partitions and the front end of the housing, through means of the anti-friction means 18 and the three shafts are connected together by the chain and sprocket shown generally at 19, the first shaft having a small sprocket thereon, the second having a larger sprocket thereon, and this second shaft also having a small sprocket thereon which is engaged by the chain which connects this second shaft to the third shaft, said third shaft having a still larger sprocket thereon over which the last-mentioned chain passes.

This third shaft is connected to the stub shaft 7 by the beveled gears 20. This third shaft also carries a worm gear 21 and each of the other shafts 17 carries a worm gear 22, these latter gears being connected with their shafts by the overrun clutches 23. The two gears 22 are slidably arranged on their shafts but are each held against a collar 24 on the shaft by a spring 25 on the shaft having one end bearing against a plate 26 engaging one end of the gear and its other end a part of the housing.

A worm 27 is slidably arranged on the splined part of the shaft 1 and fixed within a carriage 28 with thrust bearings 29 between the ends of the carriage and the ends of the worm and the worm is also provided with the anti-friction means 30 for reducing friction and noise in its sliding movement on the splined part of the shaft 1.

Longitudinally extending track bars 31 are arranged in the housing on which the carriage 28 slides and a spring 32 encircles the shaft 1 and tends to hold the carriage and the worm in its rearward position with the worm meshing with the worm gear 21 on the third or high speed shaft 17.

A pair of cross shafts 33 are rotatably arranged in the upper part of the housing and one end of each shaft extends from the housing. An arm 34 is fastened to the extended end of each shaft 33 and carries a pin 35 at its free end. A second arm 36 is removably mounted on the extended end of each shaft and has its free end connected to a spring 37 anchored to the housing as shown at 38. A stop pin 39 limits the movement of the arm 36 under the action of the spring 37 and it will of course be understood that when the shaft is rocked to move the arm 34 to the right in Fig. 4, the pin 35 will also cause movement of the arm 36 and thus the spring 37 is stretched.

A leaf spring 40 tends to hold the arm 34 with its pin 35 engaging the arm 36 when said arm 36 is left against the pin 39. Within the housing, each shaft 33 carries a pair of roller bearing arms 41 to engage the same. As will be seen from Fig. 1, when the carriage 28 is in a position where the worm 27 engages the gear 21 of the high speed shaft, the rollers of the arms 41 carried by the rearmost shaft 33 will be engaging the front end of the carriage so that the spring 37 associated with the rear shaft 33 will aid the spring 32 in holding the carriage in this position. The spring of the front shaft 33 will aid the spring 32 in holding the carriage in a position with the worm 27 in engagement with the intermediate gear 22.

When the worm is in engagement with the front gear 22, the front end of the carriage will engage a tubular projecting part 42 on the front end of the casing or housing.

From the foregoing it will be seen that the spring 32 will tend to hold the carriage in its rearmost position with the worm 27 engaging the worm gear 21 and when the shaft 1 is rotated, the rotary movement of the worm 27 will operate the high speed rearmost shaft 17 so as to engage with the worm gear 21 and this movement of said shaft 17 will be transmitted to the stub shaft 7 through the gear 20 and if the cultch 9 is in engagement with the teeth 8, the shaft 4 will be rotated. Of course this gives a high speed drive.

If the resistance of the load on the shaft 4 is greater than the pressure of the spring 32 and the spring 37 of the rearmost shaft 33, the worm 27 will unscrew, as it were, from the gear 21 and move forwardly into engagement with the intermediate gear 22. As the worm moves forwardly to engage the intermediate gear 22, this gear 22 will simply rotate on its shaft due to the overrun clutch but if the resistance of the spring is great enough over the load on the shaft 4, the worm gear 27 will start to move the gear 22 in a reverse direction so that the overrun clutches will take hold and thus the shaft will be rotated with the gear 22 and the rotation of this shaft can be communicated to the high speed shaft by the chain and sprocket. This of course will place the vehicle in second speed.

If the load is too great for the vehicle to be moved in second speed, the carriage and the worm 27 will move back against the action of the spring 32 and the spring 37 at the front shaft 33, until the worm meshes with the front gear 22 and then the rotary movement of the front shaft 17 will be transmitted to the intermediate shaft 17 through the chain and sprocket and from the second shaft, the motion will be transmitted to the third or high speed shaft to the other set of chain and sprockets, so that the vehicle on the shaft 4 will be rotated at low speed.

Of course as soon as the vehicle or load on the shaft 4 is overcome, the spring 32 and the front spring 37 will force the carriage and the worm 27 forwardly into the second speed position and then from the second speed position into the third or high speed position.

Each time the speed is to be changed, the throttle should be closed for an instant, and then accelerated which will facilitate the operation of the device.

The spring 25 will prevent jambing of the worm gears 22 should the worms improperly mesh therewith and when this occurs the worm gear will be moved outwardly against the action of the spring, and then the spring will return it to its proper position against the collar 24.

Thus it will be seen that I have provided a transmission means which are practically automatic and will eliminate the necessity of shifting gears except for the reverse movement.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:

1. An automatic transmission means comprising a housing, a drive shaft, extending into the housing, a driven shaft extending into the housing, a worm having sliding movement on the drive shaft, a plurality of transverse shafts, sprockets of different ratios thereon, chains passing over the sprockets, gears including a worm wheel connecting one of said transverse shafts to the driven shaft, gear worm wheels on the other transverse shafts and spring means for normally holding the worm in engagement with the worm gear on one of said transverse shafts, the said worm being adapted to move into engagement with the other worm gears when the load on the driven shaft is greater than the pressure of the spring.

2. An automatic transmission comprising a housing, a driven shaft extending into the same, a drive shaft extending into the same, a number of transverse shafts, driving connections of different ratios between the transverse shafts, a worm gear on each transverse shaft, overrun clutches for connecting all but one of said worm gears to said transverse shafts, a worm slidably but non-rotatably mounted on the drive shaft, a spring for normally holding the worm in engagement with said one of said worm gears, said worm moving into engagement with the other worm gears under the inertia of the load on the driven shaft, and spring actuated roller carrying arms tending to hold the worm in engagement with certain of said worm gears.

3. An automatic transmission comprising a casing, a drive shaft extending thereinto, a driven shaft extending into the casing, a stub shaft mounted in the casing, reverse gears on the drive and driven shafts, a clutch for connecting the driven shaft with the stub shaft, manually operated forks for moving the gear on the drive shaft into and out of mesh with the gear on the driven shaft and moving the clutch into operative and inoperative position, three transverse shafts located in the lower part of the casing, drive means turning the three shafts at different speeds, one of the shafts being geared to the stub shaft, a worm gear on each transverse shaft, a carriage slidably arranged in the casing, a worm located in the carriage and slidably but non-rotatably arranged on the drive shaft, said worm being adapted to mesh with any one of the three worm gears on the transverse shafts, and spring means for normally holding the worm on the drive shaft in engagement with the worm gear on the transverse shaft which is geared to the stub shaft, with said worm and carriage moving against the action of the spring means under the inertia of the load to interengagement with either one of the other worm gears according to the resistance offered by the load.

In testimony whereof I affix my signature.

FREDERICK SLAVEK.